Sept. 3, 1963   J. B. OTTESTAD   3,102,553
APPARATUS FOR CONTROLLING PRESSURE ENERGY
Filed Feb. 16, 1959   3 Sheets-Sheet 1
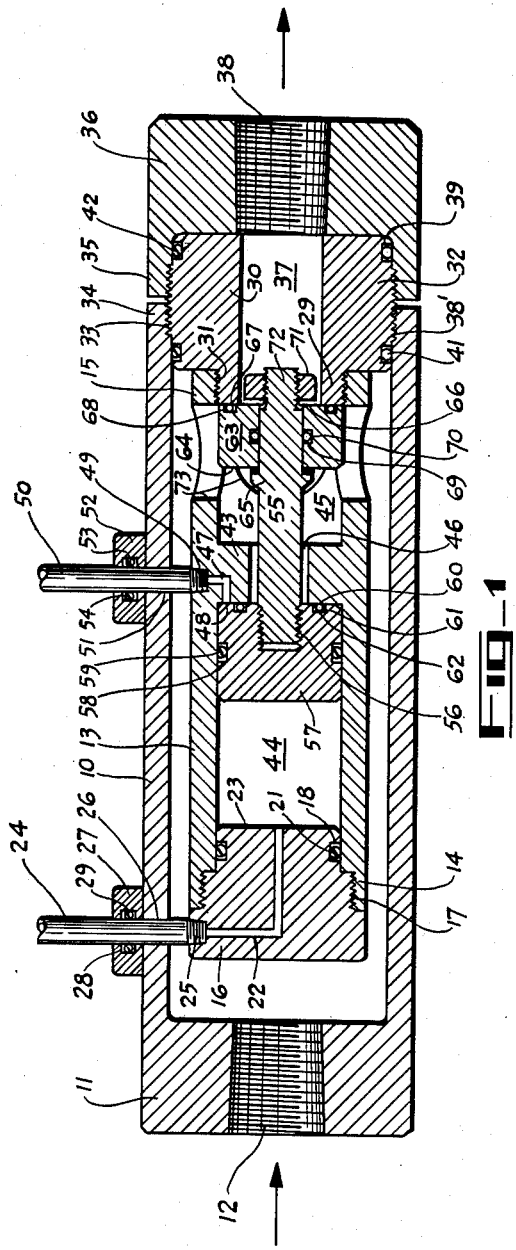
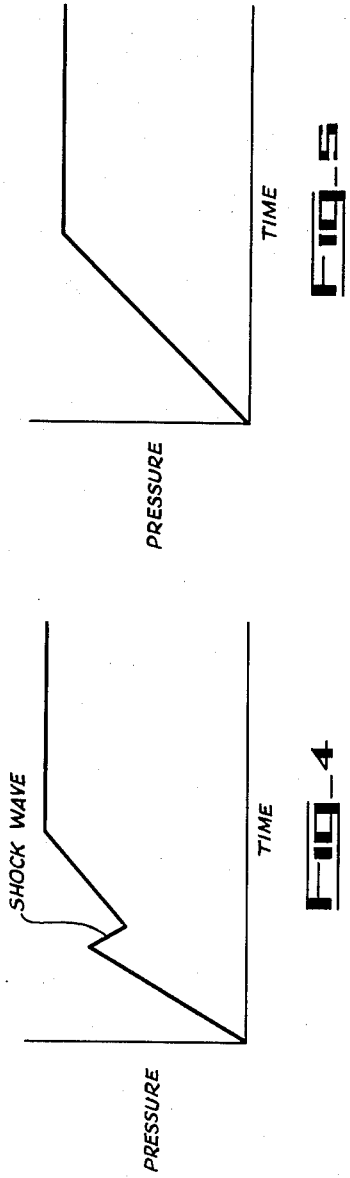
INVENTOR
JACK B. OTTESTAD
BY
*Walter J. Jason*
ATTORNEY.

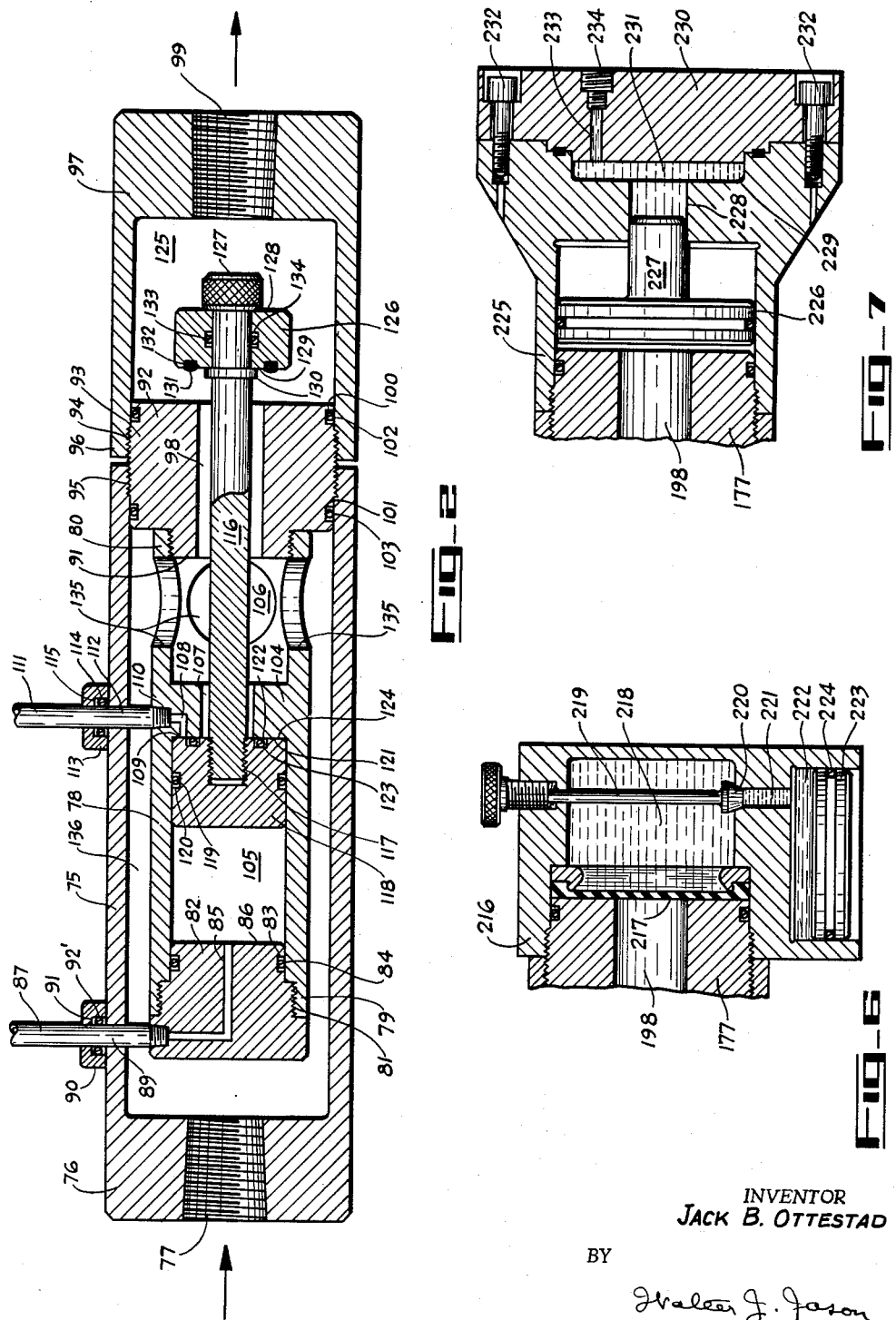

Sept. 3, 1963   J. B. OTTESTAD   3,102,553
APPARATUS FOR CONTROLLING PRESSURE ENERGY
Filed Feb. 16, 1959   3 Sheets-Sheet 3

INVENTOR
JACK B. OTTESTAD

BY
Walter J. Jason
ATTORNEY.

United States Patent Office 3,102,553
Patented Sept. 3, 1963

3,102,553
APPARATUS FOR CONTROLLING
PRESSURE ENERGY
Jack B. Ottestad, Claremont, Calif., assignor to General Dynamics Corporation, San Diego, Calif., a corporation of Delaware
Filed Feb. 16, 1959, Ser. No. 793,346
9 Claims. (Cl. 137—509)

This invention relates generally to a device for the release of stored energy and more particularly to a device capable of controlling rapid release of pressurized fluid.

Heretofore, various devices and methods have been devised to solve the problem of controlling the rapid release of energy. Among these devices are shear pins, frangible diaphragms, rapid acting valves, burning gases, and explosives. The prior art devices have many disadvantages, typical among them being relatively low speed of energy release, poor control of the output pressure-time relationship, and difficulty in accurately predetermining release pressure.

The device of the present invention not only solves the problems encountered in the controlling of rapid release of energy found in the prior art devices, but is also an improvement over the device of copending application No. 677,279, filed August 9, 1957, now Patent No. 3,039,-292.

It is therefore, an object of the present invention to overcome the disadvantages of the prior art devices by providing an improved apparatus for the very rapid controlled release of stored energy.

Another object is to provide a new and improved device for the substantially instantaneous release of stored energy.

Another object of the present invention is to provide a novel means for controllably releasing pressure more rapidly than devices heretofore known.

It is an object to provide apparatus for producing a controlled pressure-time output pattern.

Another object of the present invention is the provision of novel apparatus for use in a rapid application of power in testing of components.

It is another object of this invention to provide a novel valve for rapidly cutting off pressure applied to a component which exceeds a predetermined value.

A final object of the present invention is to provide an apparatus for producing a smooth pressure-time output pattern.

Other objects and features of the present invention, as well as many advantages thereof, will become apparent to those skilled in the art from a consideration of the following description, the appended claims, and the accompanying drawings, in which:

FIGURE 1 is an elevational cross section of an embodiment of the invention; and

FIGURE 2 is an elevational cross section of another embodiment of the present invention.

FIGURE 4 is a pressure versus time graph showing the presence of a shock wave in the released pressure when the metering pin of the present invention is not utilized.

FIGURE 5 is a pressure versus time graph showing the smooth pressure output rise when the metering pin of the present invention is used.

FIGURE 6 is an elevational cross section of a dynamic testing adapter assembly that can be used with the embodiments of FIGURES 1 and 3.

FIGURE 7 is an elevational cross section of still another adapter assembly for hydraulic pressure testing that can be used with the embodiments of the present invention shown in FIGURES 1 and 3.

Figure 3:
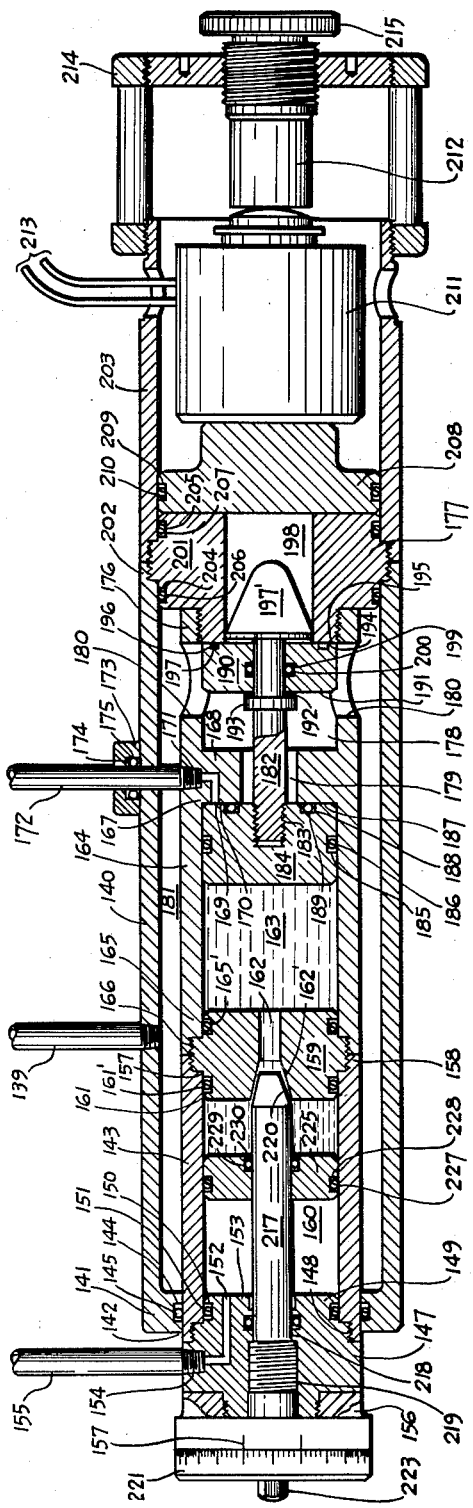
FIGURE 3 is an elevational cross section of still another embodiment of the invention utilized in a testing apparatus.

Referring to the drawings, and particularly to FIGURE 1, there is shown an embodiment of the present invention. This embodiment provides for very rapid controlled release of pressure. An elongated cylindrical housing 10 is provided with an end wall portion 11 which has an internally threaded inlet port 12 adapted to be connected to a source of line pressure (not shown). Within the housing 10 there is positioned an assembly composed of a cylindrical member 13 having internally threaded end portions 14 and 15. The end portion 14 is threadedly engaged at 17 with an externally threaded cylindrical member 16.

The cylindrical member 16 has a peripheral groove 18 which carries an annular resilient sealing member 21 to constitute a pressure seal between the cylindrical member 13 and the member 16. The member 16 is also provided with a passageway 22 which opens at one end to an inner face 23 of the member and opens at the other end into a threaded hole which receives a threaded end of pipe fitting 24. The pipe fitting 24 extends through an opening 26 in the wall of the cylindrical member 10 and is adapted to be connected to a source of fluid pressure to supply fluid under pressure therethrough in a manner to be described. A lock nut arrangement 27 having a peripheral groove 28 with an annular resilient sealing member 29 provides for a pressure seal between the pipe fitting 24 and the lock nut arrangement 27.

The other end portion 15 of the cylindrical member 16 threadedly engages an end portion 29 of a generally cylindrical shaped adapter member 30 at 31. The adapter member 30 further comprises a raised outer portion 32 in threaded engagement at 33 with the other end portion 34 of cylindrical housing member 10 and an end portion 35 of a threaded cap member 36. A bore 37 in the adapter member 30 is provided in axial alignment with an internally threaded outlet 38 in cap member 36 which is adapted to be connected to a destination of the fluid pressure (not shown). Further provision in the adapter member 30 is made for a sealing means between it and the cylinder 10 and the cap 36. This sealing means takes the form of peripheral grooves 38' and 39 each being adapted to carry annular resilient sealing members 41 and 42, respectively.

The cylindrical member 13 further comprises an internal wall member 43 which serves to divide the cylindrical member 13 into two chambers 44 and 45 connected to each other by means of an orifice 46. The internal wall member 43 is provided with a fluid passageway 47 which opens at one end to a surface 48 of the wall member 43 and at the other end opens into a hole in the wall member 43 wherein there is threadedly positioned the end 49 of a pipe fitting 50. The pipe fitting 50 extends through an opening 51 in the cylindrical member 10 and is secured in fluid tight arrangement with a lock nut 52 which carries a resilient sealing member 53 in an internal groove 54.

A rod member 55 is positioned within cylindrical member 13 such that it extends through the orifice 46 and has a threaded end portion 56 in engagement with a piston 57 slidably positioned in the chamber 44. The piston 57 carries in a peripheral groove 58 an annular resilient sealing member 59 to constitute a pressure seal between the cylinder 13 and the piston 57. On one end surface 60 of the piston there is mounted a resilient circular seal 61 in a seal base 62 and is adapted to engage surface 48 of internal wall member 43. The seal 61 is positioned such that it engages the surface 48 of the internal wall member 43 at a portion between the orifice 46 and the passageway 47. The end surface 60 of the piston normally confronts the orifice 46 as shown.

The other end of rod 55 has loosely positioned thereon a cylindrical member 63 adapted to have one of its end surfaces 64 engage a boss portion 65 on the rod 55. The other surface 66 of the member 63 is adapted to be positioned such that it abuts the end surface of the end portion 29 of the adapter member 30 and carries a resilient annular sealing member 67 located in a groove 68 in the surface 66 to provide a sealing means between the member 63 and the adapter 30. The member 63 is also provided with an internal groove 69 having a resilient annular member 70 to provide a seal between the member 63 and the shaft 55. A nut 71 adapted to threadedly engage the rod 55 at 72 serves to maintain the member 63 on the shaft. Openings 73 are provided in the wall of cylindrical member 13 near the end portion 29.

In the operation of the embodiment of FIGURE 1 described above, pressure is introduced through pipe fitting 24 into chamber 44 to urge piston 57 against surface 48 of wall member 43. The source of this setting pressure (not shown) is preferably compressed gas such as air or nitrogen. It may be a pressurized liquid or some other pressure source. With the setting pressure $P_1$ within chamber 44, a pressure equal to the pressure $P_1$ times the cross-sectional area $A_1$ of the piston 57, as encompassed by resilient seal 59, compresses the resilient seal 61 against the surface 48 of the wall member 43 around the orifice 46. A positive pressure seal is thereby effected which remains positive despite incremental displacement of the piston 57, and which isolates chamber 44 from chamber 45.

A pressure $P_2$ is provided in chamber 45 through the inlet opening 12 and openings 73 to exert force on the piston 57 opposing and balancing the force applied by the pressure $P_1$ in chamber 44, thereby effecting a balanced thrust condition on the piston. Because pressure $P_2$ acts only upon the area $A_2$ of surface 60 within seal 61, pressure $P_1$ and pressure $P_2$ are inversely proportional to the respective piston areas upon which they act, in order to obtain this balanced thrust condition.

The pressure in chamber 45 is then increased by a triggering pressure differential which unbalances the forces acting upon the piston and thereby causes a small rapid movement of the piston 57 from wall member 43. The resilient seal 61 maintains a positive pressure seal for a certain increment of this movement. A further incremental movement suddenly and effectively disengages seal 61 to break the pressure sealing between the piston 57 and wall member 43. The pressure $P_2$ in chamber 45 is released substantially instantaneously to act upon the entire cross-sectional area of piston 57, thereby exerting a very great net force upon the piston. The piston is thus impelled from the wall member 43 with extremely high acceleration and the surface 66 of the member 63 moves away from the surface of the end portion 29 of the adapter member 30 with corresponding acceleration. The force and acceleration developed upon piston 51 are obviously functions of the pressures $P_1$ and $P_2$ in chambers 44 and 45, the masses of rod 55, piston 57, member 63 and nut 71, the cross-sectional area $A_1$ of the piston 57 and the area $A_2$ of surface 60 encompassed by seal 61. For example, if pressure $P_1$ in chamber 44 is 200 pounds per square inch, pressure $P_2$ is 2000 pounds per square inch, the piston cross-sectional area is 10 square inches, and the area $A_2$ within the seal 61 is 1 square inch, the piston would be held in equilibrium with two equal 2,000 pound forces acting upon it. Assuming that a pressure of 100 pounds in addition to pressure $P_2$ is sufficient to disengage the seal in the manner described, the pressure in chamber 45 is increased to 2,100 pounds per square inch. With the pressure seal broken, a net force of 19,000 pounds suddenly acts on the piston, this force being the difference between 21,000 pounds and 2,000 pounds acting oppositely upon cross-sectional area $A_1$ of the piston. Assuming a combined weight of the rod 55, piston 57, member 63 and nut 71 to be 10 pounds, the acceleration imparted to the piston is 1900 g's, according to the equation $$F=ma$$

where $F$=force, $m$=mass, and $a$=acceleration.

Optionally, the above described embodiment can be operated by introducing a setting pressure $P_1$ into the chamber 44, and a pressure $P_2$ into the chamber 45, to provide the balanced thrust condition, as heretofore described. A triggering pressure differential of the magnitude sufficient to unbalance the forces acting on the piston 57 is then provided through the pipe fitting 50 and passageway 47 to thereby cause movement of the piston from wall member 43, as described above.

From the foregoing description, it will be apparent that the present invention provides means whereby a small force controls the release of a very great force. It will also be understood that means are provided for producing extremely high acceleration through the use of a relatively moderate energy source.

The very great accelerating force on the piston 57 makes possible an extremely rapid release of pressure through openings 73 into bore 37 and out the outlet opening 38. Pressure $P_2$ and the triggering pressure are retained within the cylinder 10 and the chamber 45 by the member 63 until the surface of the member 63 begins to move away from the surface of end portion 29 of the adapter 30. As the member 63 moves, pressure is released, the velocity of movement governing the rate of release.

From the foregoing description, it will be understood that the present invention provides means for the extremely rapid release of stored energy for use, whereby a relatively low force can control the release of a very high pressure. It will be further understood that means are provided for substantially instantaneous energy release and for control of the character rate, and duration of energy release.

Referring to FIGURE 2, there is shown another embodiment of the present invention. This embodiment provides for rapid pressure cut-off and comprises an elongated cylindrical member 75 having an end wall portion 76 which has an internally threaded inlet opening 77 adapted to be connected to a source of fluid pressure (not shown). Within the housing 75 there is positioned an assembly made up of a cylindrical member 78 having internally threaded end portions 79 and 80. The end portion 79 is threadedly engaged at 81 with an externally threaded cylindrical member 82.

The cylindrical member 82 has a peripheral groove 83 which carries an annular resilient sealing member 84 to constitute a pressure seal between the cylindrical member 78 and the member 82. The member 82 is also provided with a passageway 85 which opens at one end to an inner surface 86 of the member and opens at the other end into a threaded hole which receives a threaded end of a pipe fitting 87. The pipe fitting 87 extends through an opening 89 in the wall of the cylindrical member 75 and is adapted to be connected to a source of fluid pressure (not shown) to supply fluid under pressure therethrough in a manner to be described. A lock nut arrangement 90 having a peripheral groove 91 with an annular resilient sealing member 92' provides for a pressure seal between the pipe fitting 87 and the lock nut arrangement 90.

The other end portion 80 of the cylindrical member 78 threadedly engages an end portion 91 of a generally cylindrical shaped adapter member 92. The adapter member 92 further comprises a raised outer portion 93 in threaded engagement at 94 with the other end portion 95 of cylindrical housing member 75 and an end portion 96 of a threaded cap member 97. A bore 98 in the adapter 92 is provided in axial alignment with an internally threaded outlet opening 99 in cap member 97 which is adapted to be connected to a device requiring supply of fluid pressure thereto (not shown). A sealing means between the member 92, cylinder 75 of peripheral grooves 100 and 101 in the member 92, each being adapted to carry annular resilient sealing members 102 and 103, respectively.

The cylindrical member 78 further comprises an internal wall member 104 which forms chambers 105 and 106 connected to each other by an opening 107. The internal wall member 104 has a fluid passageway 108 which opens at one end to a surface 109 of the wall member 104 and at the other end opens into an opening in the member 78 wherein there is threadedly positioned the end 110 of a pipe fitting 111. The pipe fitting 111 extends through an opening 112 in the cylindrical member 75 and is secured in fluid tight arrangement with a lock nut 113 which carries a resilient sealing member 114 in an internal groove 115.

A rod member 116 is positioned within cylindrical member 78 such that it extends through the opening 107 and has a threaded end portion 117 in engagemnet with a piston 118 slidably positioned in chamber 105. The piston 118 carries an annular resilient sealing member 119 in a peripheral groove 120 to constitute a pressure seal between the cylinder 78 and the piston 118. On one end surface 121 of the piston there is mounted a resilient circular seal 122 in a seal base 123. When the piston 118 is in its normal or most advanced position to the right, as shown, the seal 122 is adapted to engage the surface 124 of wall member 104 in encompassing relationship with the opening 107, but does not include the passageway 108.

The rod 116 further extends through the bore 98 into a chamber 125 formed by the adapter 92 and the cap 97. A cylindrical member 126 is positioned on the rod within the chamber 125 by means of a threaded nut 127 on the end of the rod in engagement with a surface 128 of the member such that the other surface 129 bears against a boss portion 130 on the rod. The cylindrical member 126 carries a resilient annular sealing member 131 located in a groove 132 in the surface 129 to provide a sealing means between the adapter 92 and the member 126 and to encompass the bore 98 when the member is in its most advanced position to the left. Further sealing means between the rod 116 and the member 126 is provided in the form of an annular resilient seal 133 positioned in a groove 134. Openings 135 in the wall of cylindrical member 78 serve to connect chamber 106 to a chamber 136.

The operation of the embodiment of FIGURE 2 incorporating the pressure cut-off controlling means in somewhat similar to that heretofore described relative to the embodiment shown in FIGURE 1.

A setting pressure $P_1$ is introduced through pipe fitting 87, passageway 85 into chamber 105 to act upon the cross-sectional area of piston 118, as defined by annular seal 120, to urge it toward wall member 104, to compress seal 123 against the surface 124 of the wall member, thereby effecting a pressure seal. This force is balanced by the greater pressure $P_2$ in chamber 106 acting upon the smaller area of surface 121 encompassed by seal 122, to establish piston equilibrium, as in the embodiment of FIGURE 1. The pressure $P_2$, which is introduced through opening 77, chamber 136 and openings 135 into chamber 106, is also applied through the bore 98, chamber 125 and outlet opening 99 to a device (not shown) adapted to receive fluid under pressure.

Upon an increase in the pressure $P_2$ being applied to the device (not shown) to a higher predetermined value which is sufficient to disengage seal 122, piston 118 is subjected to extremely high acceleration and moves with extreme velocity from bore 107. The way by which this is effected is described heretofore in connection with the embodiment shown in FIGURE 1. Motion of the piston is transmitted through rod 116 to the member 126 which seats on the bore 98 and cuts off the pressure applied to the device connected to the outlet opening 99, to thereby prevent the application of pressures to the device which are higher than the predetermined value.

Referring to FIGURE 3 there is shown still another embodiment of the present invention utilized in a testing apparatus for the very rapid controlled release of pressure to be applied in compressive testing of a specimen. An elongated cylindrical housing member 140 is provided which has a pipe fitting 139 threadedly connected thereto and leading to a source of pressure (not shown). One end portion 141 of the member 140 is formed with an opening 142 for the reception of a cylindrical section 143. A groove 144 in the end portion 141 carries an annular resilient seal 145 which constitutes a fluid pressure seal between the housing member 140 and the section 143.

A cylindrical end plug 147 is adapted to threadedly engage the section 143 at 148 such that a portion 149 extends into the section 143. The portion 149 carries a peripheral groove 150 having an annular resilient seal 151 which provides a sealing arrangement between the cylindrical end plug 147 and the cylindrical section 143. A passageway 152 opens at one end to a surface 153 and the other end opens into a threaded hole 154 of the end plug 147. A pipe fitting 155 having a threaded end is positioned in the hole 154 and is adapted to be connected to a source of pressure (not shown). The end plug 147 is also provided with an extension portion 156 threadedly positioned thereon and which carries scale markings 157 peripherally spaced along an edge.

The other end 157 of the cylindrical section 143 threadedly engaged at 158 with a member 159 to form a chamber 160. On the periphery of the member 159 there is provided a groove 161 having an annular resilient seal 161' which constitutes a fluid tight seal between the section 143 and the member 159. The member 159 is further supplied with a bore 162 having an outwardly flared end portion 162' which opens into the chamber 160. The other end of the bore 162 opens into a chamber 163 formed by a cylindrical section 164 having one end portion 165 in threaded engagement at 166 with the member 159 and an intermediate portion of the cylindrical section having an internal wall member 168. A resilient annular seal 165' in a peripheral surface groove of the member 159 constitutes a sealing means between the member 159 and the section 164. The internal wall member is provided with a fluid passageway 169 which opens at one end to a surface 170 and at the other end to an opening in section 164 wherein there is threadedly positioned the end 171 of a pipe fitting 172 which extends through the wall of cylindrical housing 140 to be connected to a source of pressure (not shown). The pipe fitting 172 is secured in fluid tight arrangement with the cylindrical member 140 by means of a lock nut 173 which has a resilient sealing member 174 in an internal groove 175.

The other end 176 of section 164 is in threaded engagement with an adapter member 177 which forms, together with the internal wall member 168, a chamber 178. A bore 179 is provided in the wall member 168, serving to join the chambers 163 and 178. The section 164 has openings 180 which connect the chamber 178 and a chamber 181 formed between the cylindrical housing member 140 and the sections 143 and 164.

A rod member 182 is positioned within the section 164 such that it extends through the bore 179 and has a threaded end portion 183 in engagement with a piston 184 which is slidably positioned in chamber 163. The piston 184 carries a peripheral groove 185 wherein there is disposed an annular resilient sealing member 186 to provide a pressure seal between the section 164 and the piston. On one end surface 187 of the piston there is mounted a resilient circular seal 188 in a seal base 189 which is adapted to engage the surface 170 of the internal wall member 168. The seal 188 is positioned such that it engages the surface 170 at a portion between the passageway 169 and the bore 179. The end surface 187 of the piston normally confronts the bore 179, as shown.

The other end of rod member 182 has loosely positioned thereon a cylindrical member 190 having an end surface 191 adapted to engage a circular seal 192 positioned on the rod member and in engagement with a boss portion 193. The other surface 194 of the member is adapted to be positioned such that a portion abuts the end surface 195 of the adapter member 177 and carries a resilient annular sealing member 196 located in a groove 197 therein, to provide a sealing means between the member 190 and the adapter member 177. The portion of the surface within the sealing member 196 is adapted to face up to a conically shaped metering pin member 197' which is threadedly mounted on the other end of rod member 182 to maintain the member 190 thereon. The metering pin member 197' is adapted to occupy a bore 198 in the adapter member. Additional sealing means in the form of a resilient annular member 199 positioned in an internal groove 200 of the member 190.

The adapter member 177 further comprises a raised outer portion 201 having a portion in threaded engagement with the other end 202 of the cylindrical housing member 140 and an end of cylindrical member 203, which is a part of an adapter assembly for compressive testing of a specimen, to be more fully described hereafter. Further provision in the adapter member 177 is made for a sealing means between the adapter member and the cylindrical housing 140 and the cylindrical member 203. This sealing means takes the form of peripheral grooves 204 and 205, each being adapted to carry annular resilient sealing members 206 and 207, respectively.

Within cylindrical member 203 there is positioned an impacting piston 208 adapted for sliding movement. A sealing means between the piston and the cylindrical member is provided in the form of a peripheral groove 209 in the piston which carries an annular resilient sealing member 210. Within the cylindrical member 203, a strain gage 211 of suitable form, is positioned to abut the piston 208 at one end and a specimen 212 at the other. Leads 213 from the strain gage are adapted to lead to a suitable indicating device (not shown). A cap member 214 is threadedly secured to the other end of cylindrical member 203 and carries a threaded adjusting member 215 which is adapted to position the specimen 212 against the strain gage.

To provide for regulation of the opening time of the opening 180, to be hereafter described, an adjusting rod 217 is positioned to extend through a bore 218 in the end plug 147 such that it threadedly engages a portion of the bore at 219 and has a conically tapered end 220 adapted for movement in and out the flared end portion 162' of the bore 162 upon rotation of an adjusting member 221 suitably mounted on the adjusting rod 217 as by a nut 223. Within chamber 160 a piston 225 is positioned on the rod 217 for sliding movement thereon. A sealing means between the piston 225 and the cylindrical section 147 takes the form of a resilient annular member 227 positioned within a peripheral groove 228 in the piston. A resilient annular seal 229 in a groove 230 provide the sealing means between the adjusting rod 217 and the piston 225. A suitable liquid is adapted to occupy the portion of chamber 160 between the piston 225 and the member 159, the bore 162 and the chamber 163, as shown, and for the purpose to be hereafter described.

In operation of the embodiment of FIGURE 3, pressure is introduced through the pipe fitting 155 into the passageway 152 and chamber 160 to urge piston 225 toward member 159. The source of this setting pressure (not shown), as in the previous embodiments, is preferably compressed gas such as air or nitrogen. Also it may be a pressurized liquid or some other pressure source. The setting pressure, thus exerted on the piston 225 is transmitted through the liquid in the portion of the chamber 160 between the piston 225 and the member 159, the liquid in bore 162, and the liquid in chamber 163. With the setting pressure being $P_1$, a force equal to the pressure $P_1$ times the cross-sectional area $A_1$ of the piston 184, as encompassed by resilient seal 186, compresses the resilient seal 188 against the surface 170 of the wall member 168 around the bore 179. A positive pressure seal is thus produced which remains positive despite incremental displacement of the piston 184, and which isolates chamber 163 from chamber 178. A pressure $P_2$ is provided in chamber 181 through the pipe fitting 139 to exert a force on the piston 184 opposing and balancing the force applied by the pressure $P_1$ in chamber 178 to thereby establish piston equilibrium as in the embodiments of FIGURES 1 and 2. Upon an increase in the pressure $P_2$ to a higher predetermined value, which is sufficient to disengage seal 188, piston 184 is subjected to extremely great force and moves with extreme acceleration and velocity from bore 179, in a manner comparable to that described with respect to the embodiments of FIGURES 1 and 2. Motion of the piston 184 is transmitted through the rod member 182 to the member 190 which unseats from the surface 195 and makes possible an extremely rapid release of pressure from the chamber 181 into bore 198. As the pressure is released, the metering pin 197' eliminates an undesirable shock wave which would otherwise be present, as shown in FIGURE 4. FIGURE 5 shows the smooth pressure rise with respect to time obtained by using the metering pin 197'. Moreover, it is to be understood that the metering pin member 197' can also be used in the embodiment of FIGURE 1.

Optionally, the embodiment of FIGURE 3 can be operated, as in the case of the embodiments of FIGURES 1 and 2, by introducing a setting pressure $P_1$ into the chamber 160, and a pressure $P_2$ into chamber 178, to provide the balanced thrust condition of the piston 184, as heretofore described. The triggering pressure is then introduced through the pipe fitting 172 and passageway 169 to unbalance the forces acting on the piston which thereby causes movement of the piston from wall member 168, as described above.

It can be readily seen that the acceleration and velocity of the piston 184 and consequently the acceleration and velocity of the surface 194 of the valve member 190, as it passes the openings this pressure rise occurs. In the embodiment of FIGURE 3, a means for regulating the acceleration and velocity of the valve member 190 in the form of the adjusting rod 217 is provided. It can be seen that prior to the setting in motion of the piston 184, a predetermined positioning of the tapered end 220 of the adjusting rod within the flared end 162' of the bore 162 determines the portion of the total cross-sectional area of the end which is open to the flow of fluid from chamber 163 as the piston 184 moves. It is evident that the greater the portion of the flared end open to the flow of fluid, the more rapid the displacement of the fluid in chamber 163 through the bore 162 to the chamber 160, resulting in a more rapid displacement of the piston 184. The position of the rod member end 220 with respect to the flared end portion 162' is determined by rotation of the member 221 with respect to the extension portion 156 through a predetermined number of scale unit 157 thereon.

With the rapid release of pressure into bore 198 from the openings 180, a force is rapidly applied to the piston 208 which compressively impacts the strain gage 211. The compressive force exerted on the strain gage is applied to the specimen 212 under test and the amount of compressive force applied to the specimen is obtained from an appropriate indicating means, (not shown), which is attached to the leads 215 in any conventional manner to be responsive to stresses and strains produced in the strain gage.

From the foregoing description it is apparent that the embodiment of FIGURE 3 provides a means whereby a small force controls the release of a very great force and provides for application of the released force to a specimen for compressive testing thereof.

Referring to FIGURE 6, there is shown an adapter assembly which can be readily utilized with the pressure release portions of the embodiments of FIGURES 1 and 3 for dynamic testing of components. The adapter assembly is shown as being mounted on the adapter member 177 of the embodiment of FIGURE 3, by way of example, but it is to be understood that it is also capable of use in the embodiment of FIGURE 1, merely by mounting it on the adapter member 30 in place of the cap member 36.

The adapter assembly of FIGURE 6 consists of a housing 216 threadedly positioned on the adapter member 177. Fluid pressure released into the bore 198 is exerted through a flexible diaphragm 217 mounted in fluid tight engagement between the housing and the adapter to a volume of liquid 218 in the housing. A manually adjustable valve 219, which has a tapered head portion 220 adapted for movement in and out a passage 221, regulates the flow of liquid 218 into a cylindrical chamber portion 222. A piston 223 is positioned in the cylindrical chamber portion for sliding movement therein. A seal 224 maintains the piston in sealing engagement with the cylindrical chamber portion.

In operation of the adapter assembly of FIGURE 6, the fluid pressure released into bore 198 is transmitted through the flexible diaphragm 217, causing flow of the liquid 218 through passage 221 and consequential movement of the piston 223, which is adapted to strike the component under test (not shown).

From the foregoing description it will be apparent that there is provided a means whereby the rapidly released pressure is applied to a component under test.

Referring to FIGURE 7, there is shown still another adapter assembly for hydraulic pressure testing which is shown as being mounted on the adapter member 177 of the embodiment of FIGURE 3, by way of example but it is to be understood as also capable of use in the embodiment of FIGURE 1, merely by mounting it on the adapter member 30 in place of the cap member 36.

The adapter assembly of FIGURE 7 consists of a head member 225 adapted to be threadedly positioned on the member 177. A piston 226 and a plunger portion 227 assembly is mounted in the head member for sliding movement therein, the plunger portion being adapted to engage a bore 228 in the head assembly. An end plate 230 is attached to the head assembly by a suitable means such as bolts 232 and forms with the bore 228 a chamber containing any suitable pressure transmitting liquid 231. A passage 233 in the end plate 230 leads from the chamber to a threaded opening 234 which is adapted to be connected to a component under test (not shown).

It is readily apparent from the foregoing description of FIGURE 7 that the force of the pressure released into the bore 198 is transmitted by means of the piston 226, plunger 227 and fluid 228 to the component under test, thus providing for hydraulic pressure testing of the component.

While certain embodiments of the invention have been specifically disclosed, it is to be understood that the invention is not limited thereto, since many variations will be readily apparent to those skilled in the art and the invention is to be given its broadest possible interpretation within the terms of the appended claims.

What we claim is:

1. Apparatus for releasing stored energy comprising housing means, a wall having an orifice in said housing means, a piston positioned within said housing means and having a surface confronting said wall, means for exerting a first fluid pressure on said piston urging said piston toward said wall to cover said orifice, means for effecting a pressure seal between said piston and said wall, means for applying a second fluid pressure on an area of said surface covering said orifice to balance said first fluid pressure, means for exerting a third fluid pressure on an area of said surface outside said pressure seal for co-acting with said second fluid pressure to disengage said pressure seal and expose an increased area of said piston to said second fluid pressure to move said piston, and pressure release means attached to said piston for releasing said second fluid pressure to an opening in said housing means after movement of said piston is begun, said pressure release means being positioned to cover said opening when said piston is urged toward said wall to effect said pressure seal.

2. Apparatus for releasing pressurized fluid comprising housing means, a wall with an orifice in said housing means, a piston member positioned within said housing and having a surface confronting said wall, means for exerting a first fluid pressure on said piston member urging said piston member toward said wall to cover said orifice, a resilient pressure seal surrounding said orifice and disposed between said piston member surface and said wall for effecting a pressure seal therebetween, inlet means in said housing means for applying a second fluid pressure on an area of said surface within said seal, means for exerting a third fluid pressure on said piston member outside said pressure seal for co-acting with said second fluid pressure to disengage said pressure seal and expose an increased area of said piston member to said second fluid pressure to move said piston member, outlet means in said housing means, and pressure release means attached to said piston member for releasing said second fluid pressure to said outlet means after movement of said piston member is begun, said pressure release means being positioned to cover said outlet means when said piston member is urged toward said wall to effect said pressure seal.

3. Apparatus for releasing pressurized fluid comprising housing means, a wall with an orifice in said housing means, a piston member positioned within said housing means and having a surface confronting said wall, means for exerting a first fluid pressure on said piston member urging said piston member for releasing said second fluid pressure a resilient pressure seal surrounding said orifice and disposed between said piston member surface and said wall for effecting a pressure seal therebetween, inlet means in said housing means for applying a second fluid pressure on an area of said surface within said seal, means for exerting a third fluid pressure on said piston member outside said pressure seal for co-acting with said second fluid pressure to disengage said pressure seal and expose an increased area of said piston member to said second fluid pressure to move said piston member, outlet means in said housing means, and pressure release means attached to said piston member for relasing said second fluid pressure to said outlet means after movement of said piston member is begun, said pressure release means being positioned to cover said outlet means when said piston member is urged toward said wall to effect said pressure seal and having means movable within said outlet means for metering said released second fluid pressure to provide smooth pressure rise.

4. Apparatus for releasing stored energy comprising housing means, a wall having an orifice in said housing means, a piston positioned within said housing means and having a surface confronting said wall, means for exerting a first fluid pressure on said piston urging said piston toward said wall to cover said orifice, means for effecting a pressure seal between said piston and said wall, means for applying a second fluid pressure on an area of said surface covering said orifice to overbalance said first fluid pressure force and allow said second fluid pressure to act upon an increased area of said surface to move said piston, means defining an outlet in said housing means, and pressure release means for releasing said second fluid pressure to said outlet after movement of said piston is begun, said pressure release means comprising a rod member connected to said piston to extend through said orifice, a member loosely mounted on said rod member, boss means on said rod member for urging said member to cover said outlet when said piston is urged toward said wall to effect said pressure seal, and means for retaining said member on said rod member.

5. Apparatus for releasing stored energy comprising housing means, a wall having an orifice in said housing means, a piston positioned within said housing means and having a surface confronting said wall, means for exerting a first fluid pressure on said piston urging said piston toward said wall to cover said orifice, means for effecting a pressure seal between said piston and said wall, means for applying a second fluid pressure on an area of said surface covering said orifice to overbalance said first fluid pressure and allow said second fluid pressure to act upon an increased area of said surface to move said piston, and pressure release means for releasing said second fluid pressure to an opening in said housing means after movement of said piston is begun, said pressure release means comprising a rod member connected to said piston to extend through said orifice, a member loosely mounted on said rod member, boss means on said rod member for urging said member to cover said opening when said piston is urged toward said wall to effect said pressure seal, and means for retaining said member on said rod member, said retaining means comprising a metering member positioned on said rod member for movement within said opening to meter said released second fluid pressure to provide smooth pressure rise.

6. Apparatus for releasing stored energy comprising housing means, a first wall having an orifice in said housing means, a second wall having a bore with an outwardly tapered portion, within said housing means, a first piston positioned within said housing means for movement between said first and second walls, said first piston having a surface confronting said first wall, a second piston positioned within said housing means to confront said outwardly tapered portion of said bore and for movement between said second wall and an end of said housing means, means for applying force to urge said second piston toward said second wall, a fluid medium between said first and second pistons for transmitting said force to urge said first piston toward said first wall to cover said orifice, means for effecting a pressure seal between said first piston and said first wall, means for applying pressure on an area of said surface covering said orifice to overbalance said force and expose an increased area of said surface to said pressure to move said first piston, means defining an outlet in said housing means, pressure release means attached to said first piston for releasing said pressure to said outlet after movement of said first piston is begun, said pressure release means being positioned to cover said outlet when said first piston is urged toward said first wall to effect said pressure seal, and means for selectively regulating flow of said fluid medium through said bore upon movement of said first piston to regulate release of said pressure to said outlet, said regulating means comprising an adjustment element positioned through said second piston to provide sliding movement of said second piston thereon, one end portion of said adjustment element being in threaded engagement with said housing means for positional adjustment, the other end of said adjustment element being tapered and cooperable with said outwardly tapered portion of said bore for selective positioning therein.

7. Apparatus for releasing stored energy comprising housing means, a first wall having an orifice in said housing means, a second wall having a bore with an outwardly tapered portion with said housing means, a first piston positioned within said housing means for movement between said first and second walls, said first piston having a surface confronting said first wall, a second piston positioned within said housing means to confront said outwardly tapered portion of said bore and for movement between said second wall and an end of said housing means, means for applying force to urge said second piston toward said second wall, a fluid medium between said first and second pistons for transmitting said force to urge said first piston toward said first wall to cover said orifice, means for effecting a pressure seal between said first piston and said first wall, means for applying pressure on an area of said surface covering said orifice to overbalance said force and expose an increased area of said surface to said pressure to move said first piston, means defining an outlet in said housing means, pressure release means attached to said first piston for releasing said pressure to said outlet after movement of said first piston is begun, said pressure release means being positioned to cover said outlet when said first piston is urged toward said first wall to effect said pressure seal and having means movable within said outlet for metering said released pressure to provide smooth pressure rise, and means for selectively regulating flow of said fluid medium through said bore upon movement of said first piston to regulate release of said pressure to said outlet, said regulating means comprising an adjustment element positioned through said second piston to provide sliding movement of said second piston thereon, one end portion of said adjustment element being in threaded engagement with said housing means for positional adjustment, the other end of said adjustment element being tapered and cooperable wtih said outwardly tapered portion of said bore for selective positioning therein.

8. Apparatus for releasing stored energy comprising housing means, a first wall having an orifice in said housing means, a second wall having a bore with an outwardly tapered portion within said housing means, a first piston positioned within said housing means for movement between said first and second walls, said first piston having a surface confronting said first wall, a second piston positioned within said housing means to confront said outwardly tapered portion of said bore and for movement between said second wall and an end of said housing means, means for applying force to urge said second piston toward said second wall, a fluid medium between said first and second pistons for transmitting said force to urge said first piston toward said first wall to cover said orifice, means for effecting a pressure seal between said first piston and said first wall, means for applying pressure on an area of said surface covering said orifice to overbalance said force and expose an increased area of said surface to said pressure to move said first piston, means defining an outlet in said housing means, a rod member connected to said first piston to extend through said orifice, a member loosely mounted on said rod member, boss means on said rod member for urging said member to cover said outlet when said first piston is urged toward said first wall to effect said pressure seal, means for retaining said loosely mounted member in said rod member, said retaining means comprising a metering member positioned on said rod member for movement within said outlet to meter said released pressure to provide smooth pressure rise, and an adjustment element positioned through said second piston to provide sliding movement of said second piston thereon, one end portion of said adjustment element being in threaded engagement with said housing means for positional adjustment, the other end of said adjustment element being tapered and cooperable with said outwardly tapered portion of said bore for selective positioning therein to selectively regulate flow of said fluid medium through said bore upon movement of said first piston to regulate release of said pressure to said outlet.

9. Apparatus for releasing stored energy comprising housing means, a first wall having an orifice in said housing means, a second wall having a bore with an outwardly tapered portion within said housing means, a first piston positioned within said housing means for movement between said first and second walls, said first piston having a surface confronting said first wall, a second piston positioned within said housing means to confront said outwardly tapered portion of said bore and for movement between said second wall and an end of said housing means, means for applying a first fluid pressure to exert force urging said second piston toward said second wall, a fluid medium between said first and second pistons for transmitting said force to urge said first piston toward said first wall to cover said orifice, means for effecting a pressure seal between said first piston and said first wall, means for applying a second fluid pressure on an area of said surface covering said orifice to balance said force, means for applying a third fluid pressure on an area of said surface outside said pressure seal for co-acting with said second fluid pressure to disengage said pressure seal and expose an increased area of said surface to said second fluid pressure to move said first piston, means defining an outlet in said housing means, a rod member connected to said first piston to extend through said orifice, a member loosely mounted on said rod member, boss means on said rod member for urging said member to cover said outlet when said first piston is urged toward said first wall to effect said pressure seal, means for retaining said loosely mounted member on said rod member, said retaining means comprising a metering member positioned on said rod member for movement within said outlet to meter said released second fluid pressure to provide smooth pressure rise, and an adjustment element positioned through said second piston to provide sliding movement of said second piston thereon, one end portion of said adjustment element being in threaded engagement with said housing means for positional adjustment, the other end of said adjustment element being tapered and cooperable with said outwardly tapered portions of said bore for selective positioning therein to selectively regulate flow of said fluid medium through said bore upon movement of said first piston to regulate release of said second fluid pressure to said outlet.

References Cited in the file of this patent

UNITED STATES PATENTS

| | | |
|---|---|---|
| 495,767 | Winans | Apr. 18, 1893 |
| 635,149 | Schreidt | Oct. 17, 1899 |
| 2,261,135 | Boynton | Nov. 4, 1941 |
| 2,552,479 | Copping | May 8, 1951 |
| 2,585,575 | Nedergaard | Feb. 12, 1952 |
| 2,891,570 | Krupp | June 23, 1959 |

FOREIGN PATENTS

| | | |
|---|---|---|
| 378,246 | Italy | Jan. 26, 1940 |